United States Patent
Segall

(10) Patent No.: US 7,826,673 B2
(45) Date of Patent: Nov. 2, 2010

(54) METHODS AND SYSTEMS FOR INTER-LAYER IMAGE PREDICTION WITH COLOR-CONVERSION

(75) Inventor: Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 954 days.

(21) Appl. No.: 11/626,367

(22) Filed: Jan. 23, 2007

(65) Prior Publication Data

US 2008/0175495 A1 Jul. 24, 2008

(51) Int. Cl.
*G06K 9/36* (2006.01)
*G06K 9/00* (2006.01)
*G06K 9/46* (2006.01)

(52) U.S. Cl. .................. 382/238; 382/167; 382/190

(58) Field of Classification Search .................. 382/162, 382/164, 166, 167, 190, 218–220, 232, 236, 382/238, 254, 276, 277, 284; 345/589, 591, 345/600–604; 358/1.9, 515, 518, 523, 525, 358/530; 375/240.02, 240.08, 240.1, 240.14, 375/E7.126; 341/50, 51; 348/234, 661
See application file for complete search history.

(56) References Cited

U.S. PATENT DOCUMENTS

| | | | | |
|---|---|---|---|---|
| 5,105,267 | A | * | 4/1992 | Hayashi ..................... 358/515 |
| 5,448,379 | A | * | 9/1995 | Ishihara et al. ............. 358/518 |
| 5,500,677 | A | | 3/1996 | Fert et al. |
| 5,603,012 | A | | 2/1997 | Sotheran |
| 5,748,858 | A | * | 5/1998 | Ohtsuka et al. ............. 358/1.9 |
| 5,777,678 | A | | 7/1998 | Ogata et al. |
| 5,786,908 | A | * | 7/1998 | Liang .......................... 358/518 |
| 5,832,120 | A | | 11/1998 | Prabhakar et al. |

(Continued)

FOREIGN PATENT DOCUMENTS

EP          0644695          3/1995

(Continued)

OTHER PUBLICATIONS

Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.

(Continued)

*Primary Examiner*—Amir Alavi
(74) *Attorney, Agent, or Firm*—Michael Blaine Brooks, PC; Michael B. Brooks; David Ripma

(57) ABSTRACT

Methods for predicting a high dynamic range (HDR) image element based on a received low dynamic range (LDR) image element or data and a HDR image element or data. LDR data is extracted to create either a color-converted image element or a LDR image luminance element and a LDR image chrominance element. The created image element or elements are modified either based on prediction data or through a luminance modification operation and a chrominance modification operation. The HDR residual image element is then combined with either a HDR prediction image element or a HDR luminance prediction element and a HDR chrominance prediction element to form an HDR image element. Alternatively, a residual HDR image element may be calculated through a comparison operation.

21 Claims, 6 Drawing Sheets

U.S. PATENT DOCUMENTS

| | | | |
|---|---|---|---|
| 5,930,397 | A | 7/1999 | Tsujii et al. |
| 5,960,110 | A * | 9/1999 | Usami ........................ 382/167 |
| 6,057,884 | A | 5/2000 | Chen et al. |
| 6,075,573 | A * | 6/2000 | Shyu ........................... 348/661 |
| 6,100,999 | A * | 8/2000 | Ikegami ...................... 358/1.9 |
| 6,396,422 | B1 | 5/2002 | Barkan |
| 6,396,595 | B1 * | 5/2002 | Shimazaki .................. 358/1.9 |
| 6,400,996 | B1 | 6/2002 | Hoffberg et al. |
| 6,490,320 | B1 | 12/2002 | Vetro |
| 6,493,386 | B1 | 12/2002 | Vetro |
| 6,574,279 | B1 | 6/2003 | Vetro |
| 6,748,020 | B1 | 6/2004 | Eifrig et al. |
| 6,765,931 | B1 | 7/2004 | Rabenko |
| 6,795,501 | B1 | 9/2004 | Zhu et al. |
| 6,829,301 | B1 | 12/2004 | Tinker et al. |
| 6,850,252 | B1 | 2/2005 | Hoffberg |
| 6,867,717 | B1 | 3/2005 | Ion et al. |
| 6,879,731 | B2 | 4/2005 | Kang et al. |
| 6,895,052 | B2 | 5/2005 | Hanamura et al. |
| 6,968,007 | B2 | 11/2005 | Barrau |
| 6,996,173 | B2 | 2/2006 | Wu |
| 7,006,881 | B1 | 2/2006 | Hoffberg et al. |
| 7,010,174 | B2 | 3/2006 | Kang et al. |
| 7,447,354 | B2 * | 11/2008 | Sasaki et al. ................. 382/166 |
| 7,535,383 | B2 * | 5/2009 | Segall et al. .................. 341/50 |
| 2002/0054638 | A1 | 5/2002 | Hanamura |
| 2002/0154694 | A1 | 10/2002 | Birch |
| 2003/0035488 | A1 | 2/2003 | Barrau |
| 2003/0043908 | A1 | 3/2003 | Gao |
| 2003/0112863 | A1 | 6/2003 | Demos |
| 2003/0194007 | A1 | 10/2003 | Chen et al. |
| 2004/0001547 | A1 | 1/2004 | Mukherjee |
| 2004/0151249 | A1 | 8/2004 | Morel |
| 2005/0013501 | A1 | 1/2005 | Kang et al. |
| 2005/0030315 | A1 | 2/2005 | Cohen et al. |
| 2005/0147163 | A1 | 7/2005 | Li |
| 2006/0002611 | A1 | 1/2006 | Mantiuk et al. |
| 2006/0077405 | A1 | 4/2006 | Topfer et al. |
| 2006/0083303 | A1 | 4/2006 | Han et al. |
| 2006/0126962 | A1 | 6/2006 | Sun |
| 2006/0153294 | A1 | 7/2006 | Wang et al. |
| 2006/0181618 | A1 * | 8/2006 | Kameyama .................. 348/234 |
| 2006/0200253 | A1 | 9/2006 | Hoffberg et al. |
| 2006/0200258 | A1 | 9/2006 | Hoffberg et al. |
| 2006/0200259 | A1 | 9/2006 | Hoffberg et al. |
| 2006/0200260 | A1 | 9/2006 | Hoffberg et al. |
| 2006/0209959 | A1 | 9/2006 | Sun |
| 2006/0210185 | A1 | 9/2006 | Sun |
| 2006/0221760 | A1 | 10/2006 | Chen |
| 2006/0251330 | A1 | 11/2006 | Toth et al. |
| 2007/0019872 | A1 * | 1/2007 | Birinov et al. ............... 382/236 |
| 2007/0140354 | A1 | 6/2007 | Sun |
| 2007/0160133 | A1 | 7/2007 | Bao et al. |
| 2007/0201560 | A1 | 8/2007 | Segall et al. |
| 2008/0175494 | A1 * | 7/2008 | Segall ......................... 382/238 |
| 2008/0175495 | A1 * | 7/2008 | Segall ......................... 382/238 |
| 2008/0175496 | A1 * | 7/2008 | Segall ......................... 382/238 |
| 2008/0175497 | A1 * | 7/2008 | Segall ......................... 382/238 |
| 2008/0253672 | A1 * | 10/2008 | Segall ......................... 382/238 |
| 2009/0175338 | A1 * | 7/2009 | Segall .................... 375/240.14 |

FOREIGN PATENT DOCUMENTS

| | | |
|---|---|---|
| EP | 0966162 | 12/1999 |
| EP | 1170954 A1 | 1/2002 |
| EP | 1195992 A1 | 4/2002 |
| EP | 1248466 A1 | 10/2002 |
| JP | 2005-056271 | 3/1993 |
| JP | 7162870 | 6/1995 |
| JP | 9070044 | 3/1997 |
| JP | 9182085 | 7/1997 |
| JP | 1018085 | 1/1999 |
| JP | 11331613 | 11/1999 |
| JP | 2000184337 | 6/2000 |
| JP | 2004-363931 | 12/2004 |
| JP | 2005-80153 | 3/2005 |
| JP | 2005-094054 | 4/2005 |
| JP | 2005-167431 | 6/2005 |

OTHER PUBLICATIONS

Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201 ; $22^{nd}$ Meeting: Marrakech, Morocco, Jan. 13-19, 2007.

International Search Report for PCT/JP2008/054687.

Andrew Segall, "SVC-to-AVC Bit-stream Rewriting for Coarse Grain Scalability", Joint Video Team(JVT) of ISO/IEC MPEG $ ITU-T VCEG (ISO/IEC JTC1/SC29/WG11 and ITU-T SG16 Q.6) $20^{th}$ Meeting: Klagenfurt, Austria, Jul. 15-21, 2006, JVT-T061.

Yao-Chung Lin, Chung-Neng Wang, Tihao Chiang, Anthony Vetro, and Huifang Sun, "Efficient FGS to single layer transcoding", Digest of Technical Papers. International Conference on Consumer Electronics, 2002. ICCE. 2002, pg. 134-135.

PCT/JP2007/064040 International Search Report.

Office action dated Sep. 3, 2008 for U.S. Appl. No. 11/776,430.

F. Durand and J. Dorsey, "Fast Bilateral Filtering for the Display of High-Dynamic-Range Images", Proceedings of SIGGRAPH, San Antonio, TX, Jul. 21-26, 2002.

R. Fattal, D. Lischinski and M. Werman, "Gradient Domian High Dynamic Range Compression", Proceedings of SIGGRAPG, San Antonio, TX, Jul. 21-26, 2002.

L. Meylan and S. Susstrunk, "High Dynamic Range Image Rendering with a Retinex-Based Adaptive Filter", IEEE Transactions on Image Processing, Sep. 2005.

S. Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.

E. Reinhard, M. Stark, P. Shirley and J. Ferwerda, "Photographic Tone Reproduction for Digital Images", Proceedings of SIGGRAPH, San Antonio, TX, Jul. 21-26, 2002.

G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.

Brightside Technologies, Inc., "DR37-P: Detailed Preliminary Specifications—V2.0", http://www.brightsidetech.com/products/info/dr37p_specs.pdf.

Y Li, L. Sharan and e. Adelson, "Compressing and Companding High Dynamic Range Images with Subband Architectures", ACM Transactions on Graphics (Proceedings of SIGGRAPH '05), vol. 24, No. 3, Jul. 2005.

R. Mantiuk, G. Krawczyk, K. Myszkowski and H.P. Seidel, "Perception-motivated High Dynamic Range Video Encoding", ACM Transactions on Graphics (Special Issue: Proceedings of SIGGRAPH '04), vol. 23, No. 3, Aug. 2004.

H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.

H. Seetzen, G. Ward, and L. Whitehead, "High Dynamic Range Display Using Low and High Resolution Modulators," The Society for Information Display International Symposium, Baltimore, Maryland, May 2003.

G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.

International Search Report for International U.S. Appl. No. PCT/JP2007/050277.

Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant sections 5 and 6*.

Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005 * section 8.4.2.2.1 *.

Julien Reichel, Heiko Schwarz and Mathias Wien, "Scalable Video Coding—Working Draft 4", JVT-Q201, Nice, FR, Oct. 2005.

Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics).

International Telecommunication Union, Series H: Audiovisual and Multimedia Systems; Video coding for low bit rate communication; H.263, Geneva, Jan. 2005.

International Organisation for Standardisation, MPEG-4 Version 2 Visual Working Draft Rev 5.0, Atlantic City, Oct. 1998.

Internation Telecommunication Union, ISO/IEC 13818-2 MPEG-2, Geneva, 1995.

International Telecommunication Union, Series H: Audiovisual and Multimedia Systems; Coding of Moving Video; H.264, Mar. 2005.

Joint Video Team (JVT) of ISO/IEC MPEG & ITU-T VCEG,Advanced video coding for generic audiovisual services, ISO/IEC 14496-10, JVT-T201, Austria, Jul. 2006.

* cited by examiner

METHODS AND SYSTEMS FOR INTER-LAYER IMAGE PREDICTION WITH COLOR-CONVERSION

FIELD OF THE INVENTION

Embodiments of the present invention comprise methods and systems for inter-layer image prediction.

SUMMARY

Some embodiments of the present invention comprise methods and systems for prediction of images comprising multiple dynamic range layers.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1A:
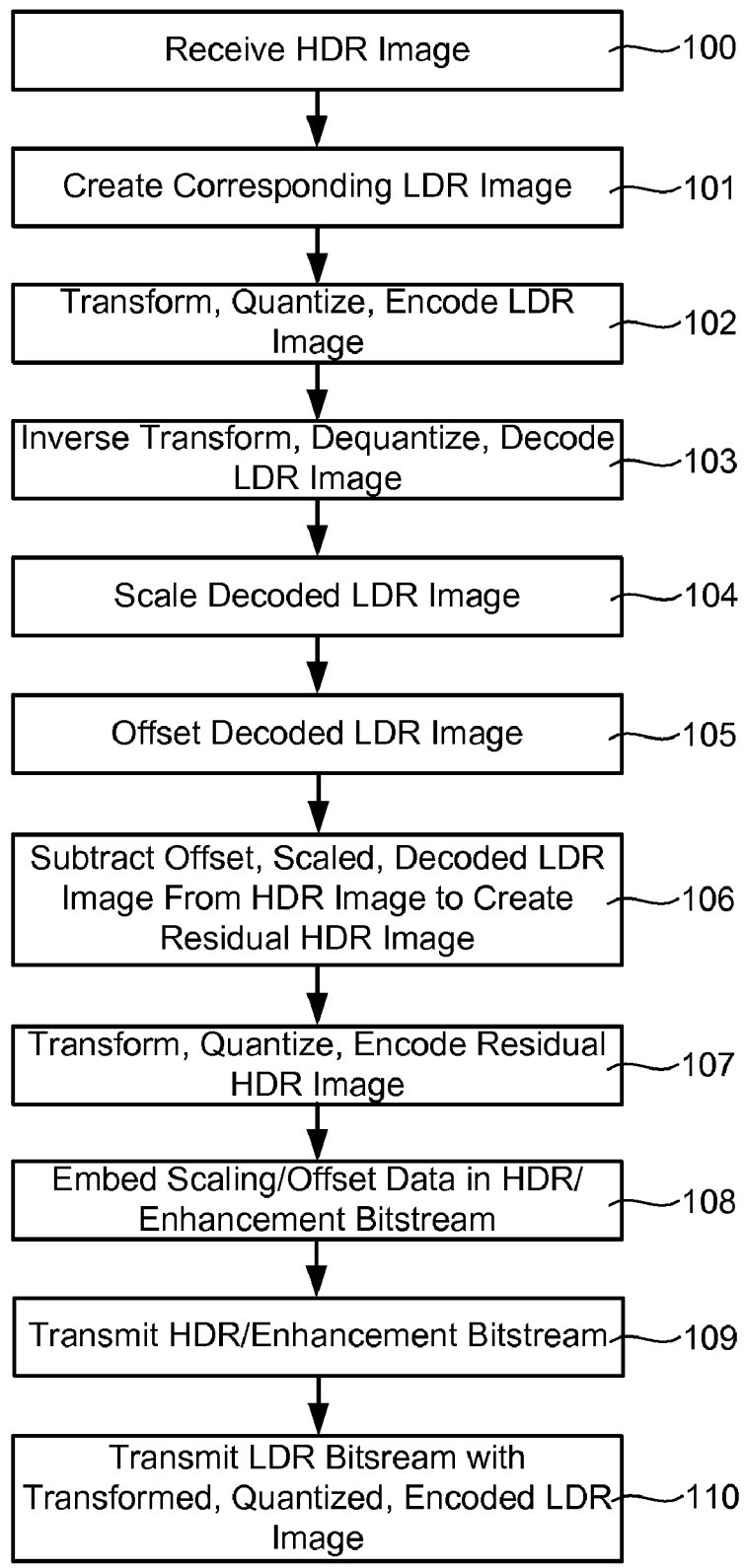
FIG. 1A is a chart showing an exemplary embodiment of the present invention comprising prediction with a scaled and offset LDR image element.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise systems and methods for using the low dynamic range video sequence to predict the high dynamic range version of the image data. This may be referred to as inter-layer prediction in this application. Some embodiments of the present invention comprise a spatially-varying inter-layer prediction mechanism for HDR video coding. Some embodiments of the present invention comprise an inter-layer prediction mechanism for HDR video coding that operates in the color spaces utilized for video compression and transmission. Some embodiments utilize gamma corrected color spaces. Exemplary embodiments may utilize xvYCC and YCbCr color spaces. Some embodiments of the present invention comprise an inter-layer prediction mechanism for HDR video coding that may be disabled spatially. Some embodiments of the present invention comprise an inter-layer prediction mechanism for HDR video coding that is multiplication free. Some embodiments of the present invention comprise an inter-layer prediction mechanism for HDR video coding that can be utilized in a single-loop decoder. Some embodiments may also be incorporated into multi-loop designs.

Embodiments of the present invention comprise an inter-layer prediction technique for high-dynamic range video coding. Some aspects of some embodiments comprise elements described in U.S. patent application Ser. No. 11/362,571 filed on Feb. 24, 2006, which is hereby incorporated herein by reference. Some embodiments of the present invention comprise a method for projecting decoded low dynamic range data to the high dynamic range coding space. This process may be referred to as inter-layer prediction.

An analogous process to inter-layer prediction for high dynamic range video coding is inter-layer prediction for bit-depth scalability. In the problem for bit-depth scalability, the baselayer of a video bit-stream contains a representation of the video sequence at a reduced bit-depth. For example, the baselayer may contain an eight-bit representation of the sequence, while the enhancement layer of the bit-stream may contain a ten-bit representation. In some scenarios, more than two layers may be used. In some scenarios, an eight-bit version may represent the eight most significant bits of the higher bit-depth sequence. The higher bit-depth version is therefore predicted by multiplying (or equivalently scaling) the decoded lower bit-depth data to the higher bit-depth. In this specific example, the eight-bit data would be decoded and subsequently scaled by a factor of four to predict the ten-bit data. This scaling may be done in either the intensity or transform domain, depending on the application.

High dynamic range video coding can be a more general case of bit-depth scalability. The baselayer and enhancement layer may contain data represented with different bit-depths. However, the baselayer may not be constrained to represent the most significant bits of the enhancement layer data. In some embodiments of the present invention, the baselayer data may contain a lower bit-depth representation of the high dynamic range sequence, and this lower bit-depth may not always correspond to the most significant bits of the corresponding higher bit-depth representation.

Some embodiments of the present invention may be described with reference to FIG. 1A. In these embodiments, a high dynamic range (HDR) image is received 100. A corresponding low dynamic range (LDR) image may also be received 101 or created from the HDR image. The LDR image may be created through a tone scale operation, a conversion function or some other method. The LDR image may then be predicted, transformed, quantized and encoded 102 as is well known in the art. In a few exemplary embodiments the LDR image may be transformed using a discrete cosine transform (DCT), a wavelet transform or by other common transformation methods. The prediction, transformation, quantization and encoding processes may then be substantially reversed 103 to provide a decoded LDR image as would be decoded at a typical decoder. Typically, a de-quantization process is lossy and therefore does not produce an exact copy of the originally encoded image. Other processes may also affect the reproduction of the original LDR image. Regardless, the decoded LDR image may be processed by one or more of the following methods: color conversion, scaling 104 and offsetting 105. The decoded, processed LDR image may now be used to create 106 a residual HDR image. This may be performed by subtracting the decoded, processed LDR image from the original HDR image. Other methods may also be used.

The residual HDR image may then be transformed, quantized and encoded 107 or otherwise prepared for transmission to a destination. This step may comprise embedding the encoded residual HDR image into an HDR or enhancement layer bitstream. Information related to the color conversion, scaling and offset operations may also be encoded and embedded 108 in the HDR or enhancement bitstream. The HDW/enhancement layer bitstream may then be transmitted 109 to a destination. An LDR/baselayer bitstream may also be transmitted to the destination. The LDR/baselayer bitstream may also comprise a transformed, quantized and encoded LDR image 110.

A decoder receiving the LDR/baselayer bitstream may then decode the LDR/baselayer image. A decoder receiving the LDR/baselayer bitstream and the HDR/enhancement layer bitstream may decode both the LDR/baselayer image and the HDR/enhancement layer image. Embodiments of the present invention comprise methods and systems for encoding and decoding images in this framework and similar scenarios.

Figure 1B:
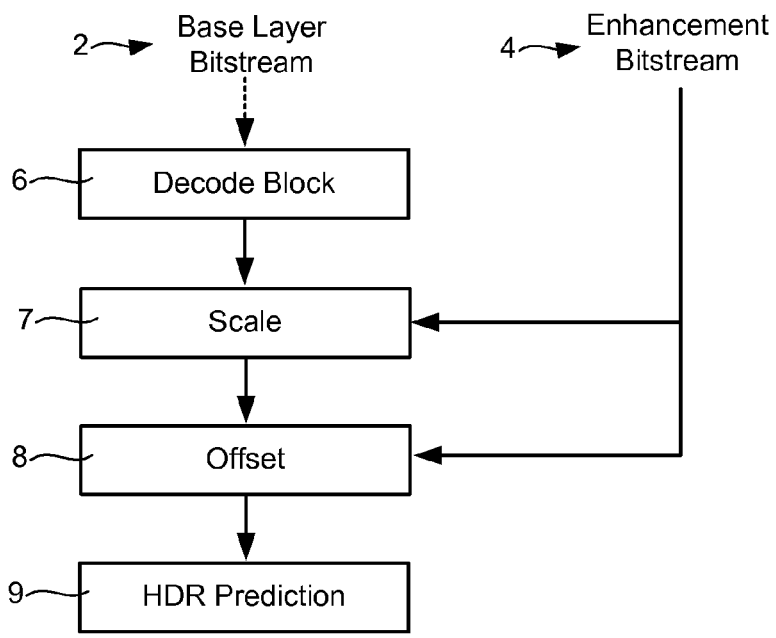
FIG. 1B is a chart showing an exemplary embodiment of the present invention comprising scaling and offsetting decoded image elements for HDR prediction.

Some embodiments of the present invention may be described with reference to FIG. 1B. In these embodiments, a baselayer decoder may receive baselayer data, such as from a baselayer bitstream 2. The baselayer decoder may decode 6 a baselayer block or other image element and represent it in the spatial domain. Some embodiments may comprise full decoding of the block, including a prediction process followed by residual refinement. Some embodiments may comprise reconstruction of the residual only. In some embodiments, the spatial information in the baselayer may be utilized to predict the high dynamic range signal. Some embodiments may comprise scaling 7 the baselayer information. Some embodiments may also comprise adding an offset 8 to the baselayer information. Some embodiments may comprise both scaling 7 and adding an offset 8. Once scaling 7 and/or adding an offset 8 are performed on the decoded baselayer information, that scaled, offset information may be used to predict 9 an enhancement layer, such as a higher dynamic range (HDR) layer. In some embodiments, scaling 7 and offset 8 data may be extracted from an enhancement layer 4 bitstream. In some embodiments, subsequent refinement may be decoded from the enhancement layer bit-stream 4.

Figure 2:
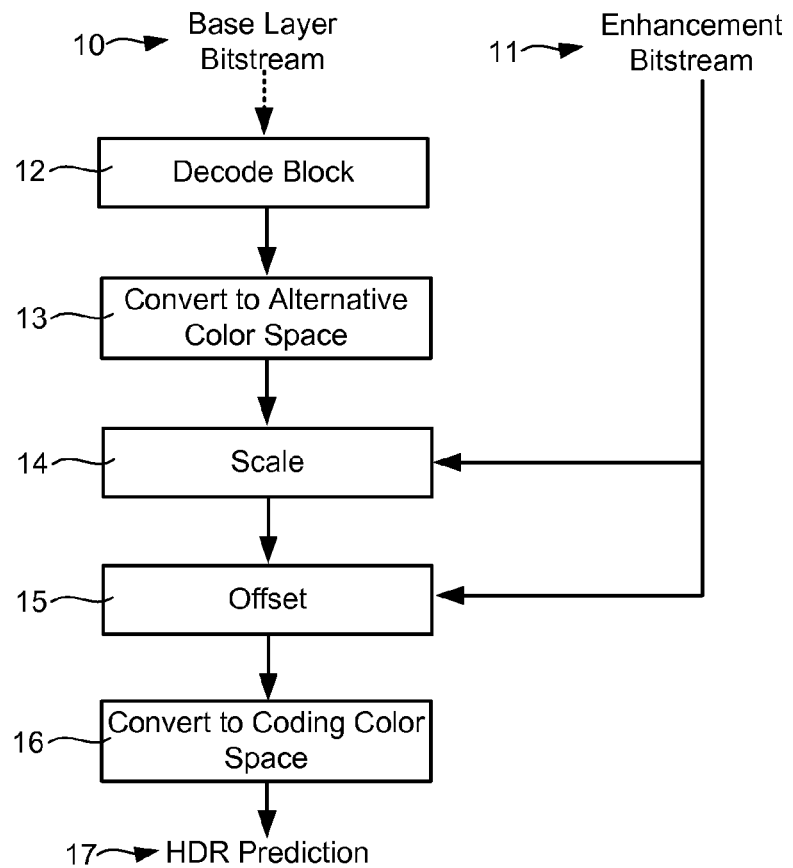
FIG. 2 is a chart showing an exemplary embodiment of the present invention comprising conversion to an alternative color space.

Some embodiments of the present invention may be described with reference to FIG. 2. In these embodiments, a decoder may receive baselayer data 10 from which a block or other image element may be decoded 12 into spatial image data. This spatial image data may then be converted 13 to an alternative color space. This converted data may then be scaled 14 and/or offset 15. Scaling and offset operations may be performed according to instructions and/or data received from an enhancement bitstream 11. This converted, scaled and/offset data may then be converted 16 back to the coding color space. Once converted back to the coding color space, the scaled and/or offset data may be used to predict 17 an enhancement layer, such as a higher dynamic range (HDR) layer.

Figure 3:
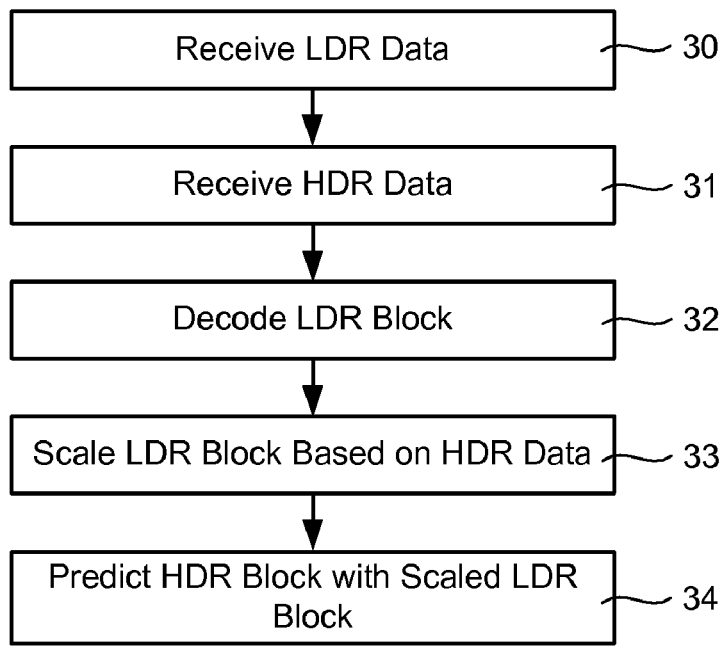
FIG. 3 is a chart showing an exemplary embodiment of the present invention comprising scaling an LDR image element according to HDR bitstream data.

Some embodiments of the present invention may be described with reference to FIG. 3. In these embodiments, an LDR/baselayer image is received 30 and corresponding HDR/enhancement layer data is also received 31. An LDR/baselayer block or image element is then decoded 32 from the LDR/baselayer image. The decoded LDR/baselayer image element is then scaled 33. This scaling may be performed according to data embedded in the HDR/enhancement layer data. Scaling of individual image elements may be related to or a function of image characteristics comprising spatial location, luminance data, chrominance data and other data. The scaled, decoded LDR/baselayer image may then be used to predict 34 a corresponding HDR block or image element. In some embodiments, the scaled, decoded LDR/baselayer image element may be added to a corresponding decoded residual image element to form an HDR/enhancement layer image element.

Figure 4:
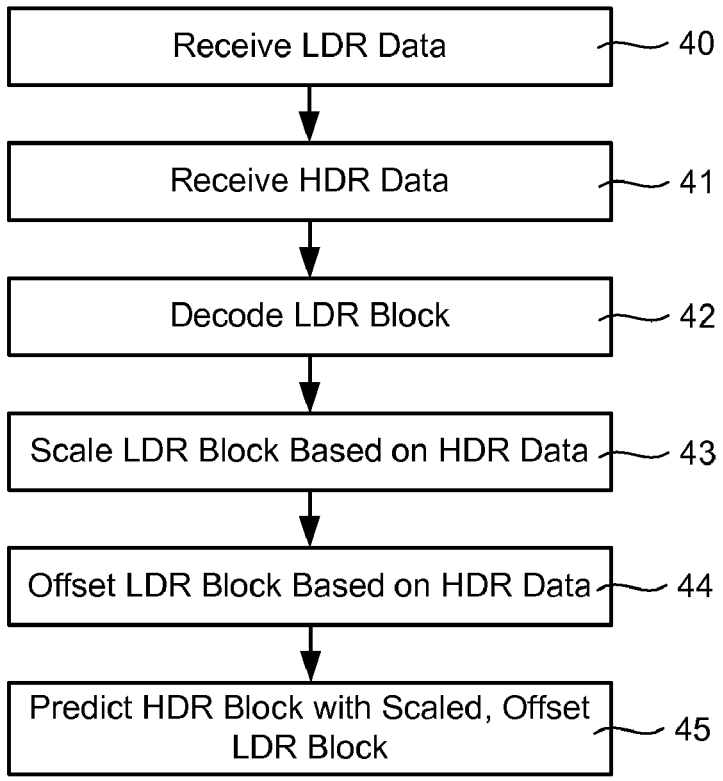
FIG. 4 is a chart showing an exemplary embodiment of the present invention comprising scaling and applying an offset to an LDR image element according to HDR bitstream data.

Some embodiments of the present invention may be described with reference to FIG. 4. In these embodiments, an LDR/baselayer image is received 40 and corresponding HDR/enhancement layer data is also received 41. An LDR/baselayer block or image element is then decoded 42 from the LDR/baselayer image. The decoded LDR/baselayer image element is then scaled 43. This scaling may be performed according to data embedded in the HDR/enhancement layer data. Scaling of individual image elements may be related to or a function of image characteristics comprising spatial location, luminance data, chrominance data and other data. An offset may then be added 44 to the scaled LDR image element. Offset data may be carried in the corresponding HDR/enhancement layer data. Offset data may vary between image elements and may be dependent on image characteristics comprising spatial location, luminance data, chrominance data and other data.

The scaled, offset and decoded LDR/baselayer image may then be used to predict 45 a corresponding HDR block or image element. In some embodiments, the scaled, offset and decoded LDR/baselayer image element may be added to a corresponding decoded residual image element to form an HDR/enhancement layer image element.

Figure 5:
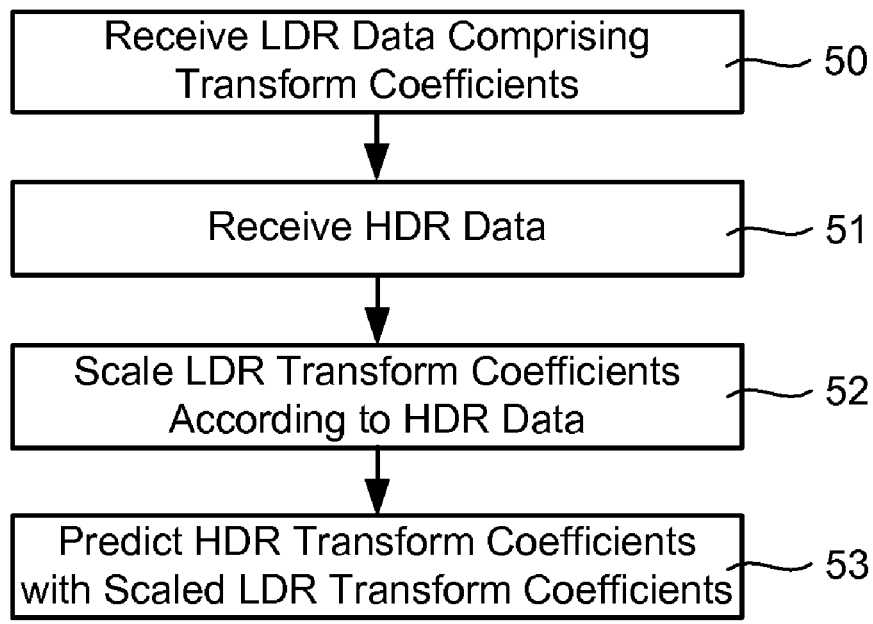
FIG. 5 is a chart showing an exemplary embodiment of the present invention comprising scaling LDR transform coefficients for HDR prediction.

Some embodiments of the present invention may be described with reference to FIG. 5. In these embodiments, an LDR/baselayer image comprising LDR transform coefficients is received 50 and corresponding HDR/enhancement layer data is also received 51. The LDR/baselayer image transform coefficients may then be scaled 52. This scaling may be performed according to data embedded in the HDR/enhancement layer data. Scaling of LDR transform coefficients may be related to or a function of image characteristics comprising spatial location, luminance data, chrominance data and other data. The scaled LDR/baselayer transform coefficients may then be used to predict 53 transform coefficients for a corresponding HDR block or image element.

Figure 6:
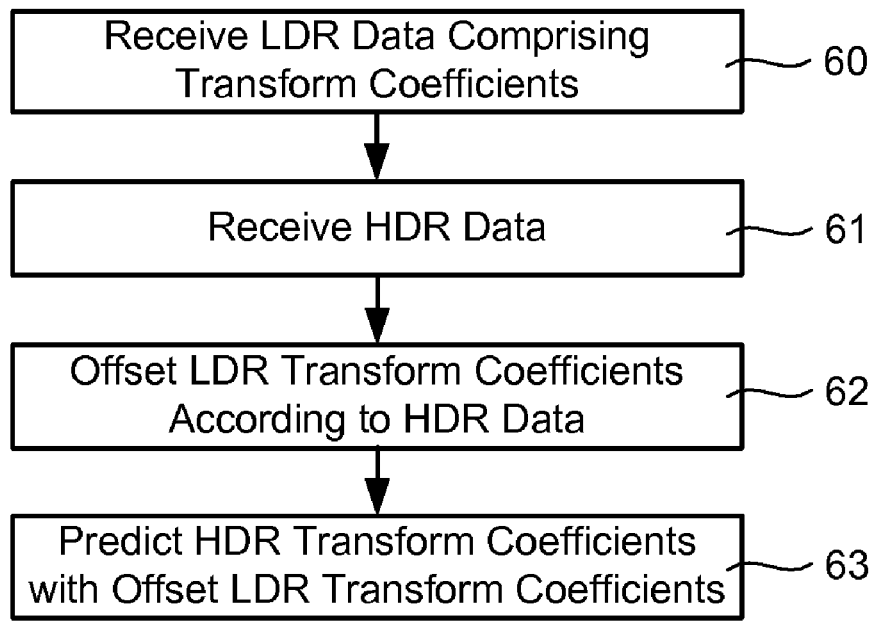
FIG. 6 is a chart showing an exemplary embodiment of the present invention comprising applying an offset to LDR transform coefficients for HDR prediction.

Some embodiments of the present invention may be described with reference to FIG. 6. In these embodiments, an LDR/baselayer image comprising LDR transform coefficients is received 60 and corresponding HDR/enhancement layer data is also received 61. The LDR/baselayer image transform coefficients may then be offset 62. Offset data may be carried in the corresponding HDR/enhancement layer data 61. Offset data may vary between image elements and may be dependent on image characteristics comprising spatial location, luminance data, chrominance data and other data. The offset LDR/baselayer transform coefficients may then be used to predict 63 transform coefficients for a corresponding HDR block or image element.

Figure 7:
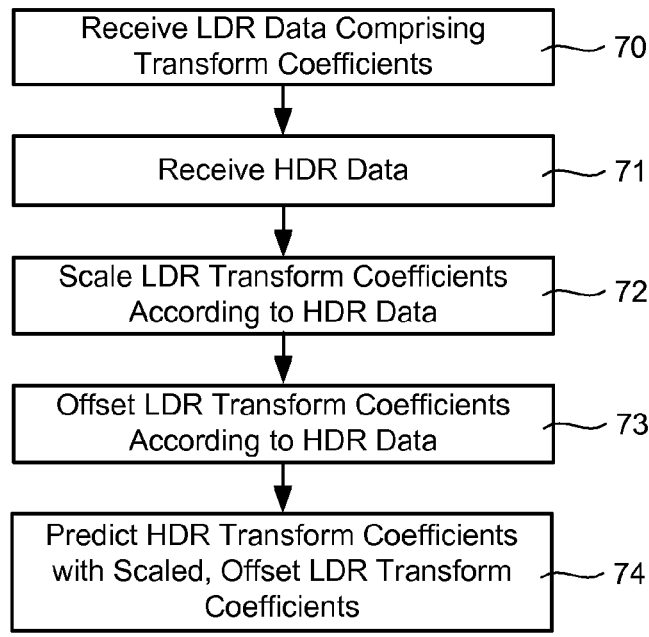
FIG. 7 is a chart showing an exemplary embodiment of the present invention comprising scaling LDR transform coefficients and applying an offset to LDR transform coefficients for HDR prediction.

Some embodiments of the present invention may be described with reference to FIG. 7. In these embodiments, an LDR/baselayer image comprising LDR transform coefficients is received 70 and corresponding HDR/enhancement layer data is also received 71. The LDR/baselayer image transform coefficients may then be scaled 72. This scaling may be performed according to data embedded in the HDR/enhancement layer data. Scaling of LDR transform coefficients may be related to or a function of image characteristics comprising spatial location, luminance data, chrominance data and other data. The scaled LDR/baselayer image transform coefficients may then be offset 73. Offset data may be carried in the corresponding HDR/enhancement layer data 71. Offset data may vary between image elements and may be dependent on image characteristics comprising spatial location, luminance data, chrominance data and other data. The scaled, offset LDR/baselayer transform coefficients may then be used to predict 74 transform coefficients for a corresponding HDR block or image element.

Figure 8:
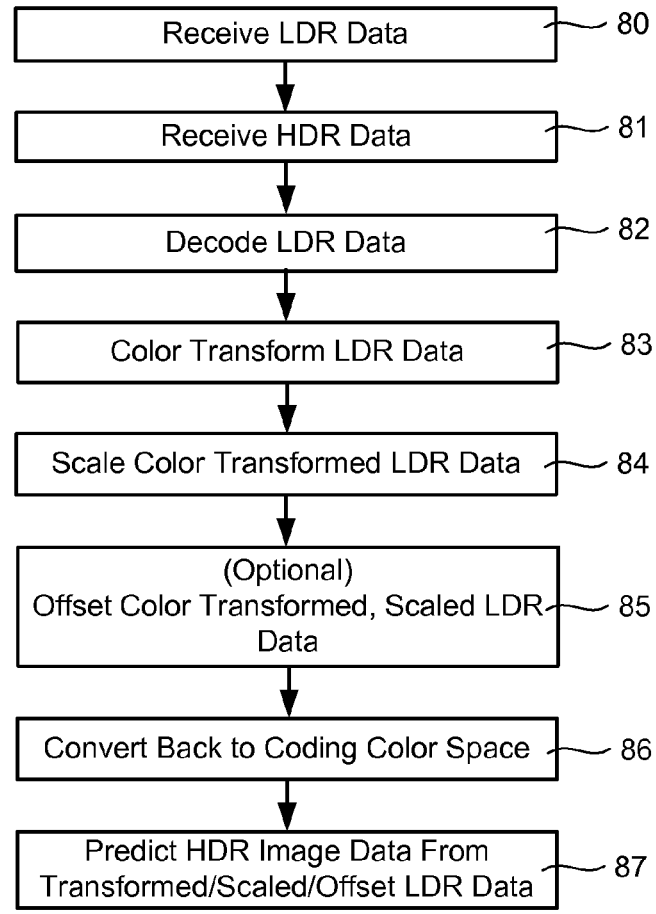
FIG. 8 is a chart showing an exemplary embodiment of the present invention comprising scaling and applying an offset to color-transformed image elements for HDR prediction.

Some embodiments of the present invention may be described with reference to FIG. 8. In these embodiments, an LDR/baselayer image is received 80 and corresponding HDR/enhancement layer data is also received 81. An LDR/baselayer block or image element is then decoded 82 from the LDR/baselayer image. The decoded LDR/baselayer image element may then be converted 83 or transformed to an alternative color format or color space. While in this alternative color space, the LDR image element may be scaled 84. This scaling may be performed according to data embedded in the HDR/enhancement layer data. Scaling of individual image elements may be related to or a function of image characteristics comprising spatial location, luminance data, chrominance data and other data. Also, while in the alternative color space, an offset may then be added 85 to the scaled, color-converted LDR image element. Offset data may be carried in the corresponding HDR/enhancement layer data. Offset data may vary between image elements and may be dependent on image characteristics comprising spatial location, luminance data, chrominance data and other data.

The scaled and/or offset and color-converted LDR/baselayer image may then be converted back 86 to the coding color space. This scaled and/or offset, coding-color-space LDR/baselayer image may then be used to predict 87 a corresponding HDR block or image element.

Figure 9:
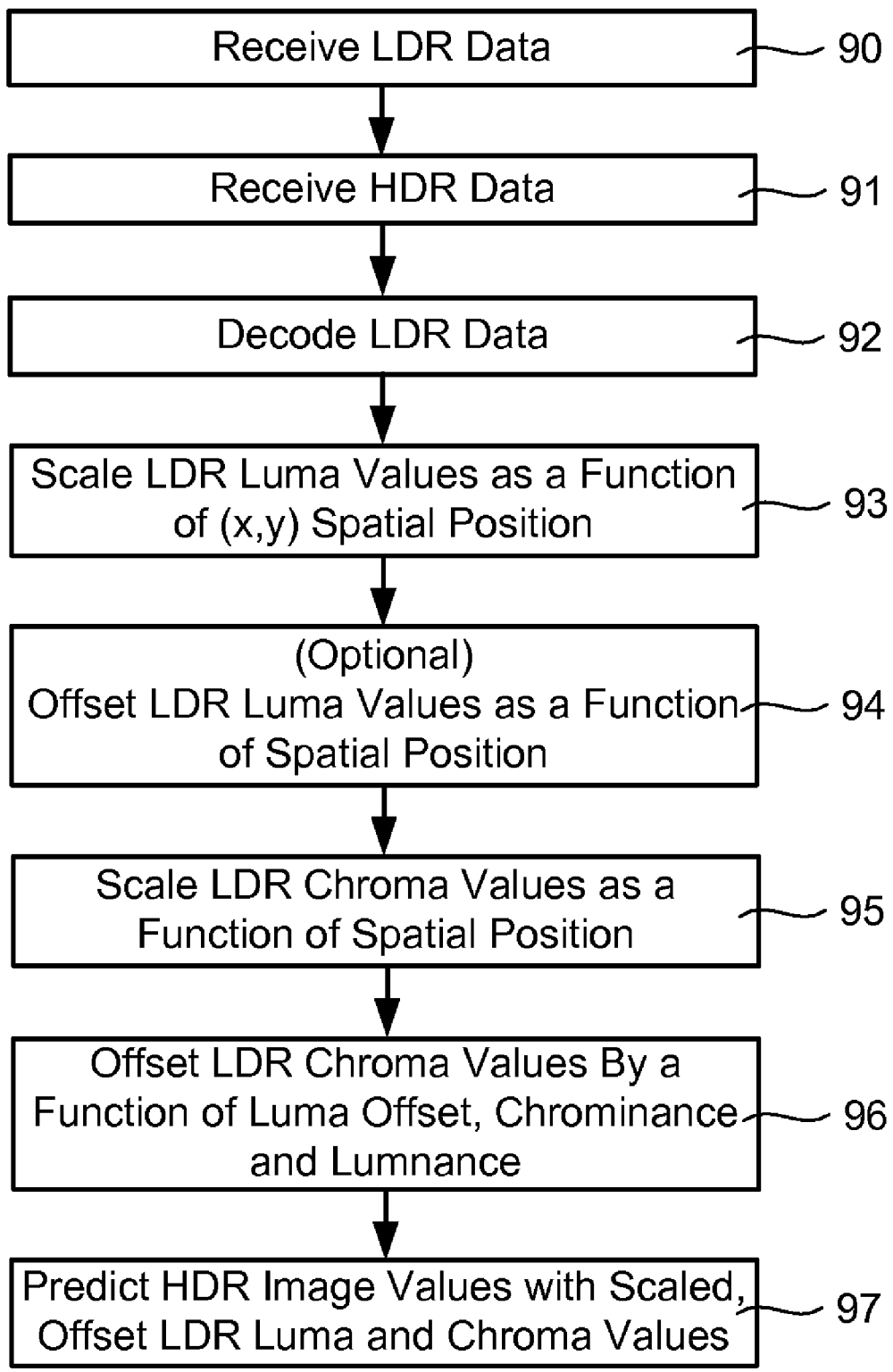
FIG. 9 is a chart showing an exemplary embodiment of the present invention comprising separate scaling and offset operations for luminance and chrominance elements.

Some embodiments of the present invention may be described with reference to FIG. 9. In these embodiments, an LDR/baselayer image is received 90 and corresponding HDR/enhancement layer data is also received 91. An LDR/baselayer block or image element may then be decoded 92 from the LDR/baselayer image. In these embodiments, the decoded LDR/baselayer image may comprise separable luminance and chrominance values. In some embodiments, luminance values may be scaled 93 in relation to their spatial position in the image. Other factors may also affect the luminance value scaling operation. In some embodiments, these luminance values may be offset 94. The offset operation may also be related to the spatial position of the luminance value. In some embodiments, the chrominance values of the decoded LDR/baselayer image may be scaled 95. This chrominance scaling may also be related to the spatial position of the chrominance value. In some embodiments, chrominance values may also be offset 96. The chrominance value offset may be related to a luminance offset, a chrominance value or scaling factor and/or a spatial position of the chrominance value. Other factors may also affect the chrominance offset.

Once the luminance and chrominance values are scaled and/or offset, they may be used to predict 97 a corresponding HDR/enhancement layer image element.

In some embodiments, the inter-layer prediction process may be controlled at a fine granularity. As a specific example, the scaling and offset factors may vary on a 4×4 block basis. That is, for every 4×4 block in the image, an encoder may signal the appropriate scaling and offset factor. Additionally, an encoder may enable and disable inter-layer prediction on a block by block basis. This allows, for example, the high dynamic range image to be predicted from the low dynamic range image in a portion of the frame while predicted with alternative mechanisms in other spatial regions. Specifically, intra-frame and inter-frame prediction mechanisms may be utilized in these other spatial regions.

Exemplary Scaling Embodiments

Some embodiments of the present invention comprise inter-layer prediction methods that are multiplication free. In these embodiments, the baselayer data may be decoded and the decoded samples may be processed with a sequence of binary shifts and adds. In some embodiments, this may be accomplished with a process described by equation 1.

$$HDR(x, y) = \sum_{\forall i} a_i * LDR(x, y) << i \qquad (1)$$

where HDR and LDR are, respectively, the high dynamic range and low dynamic range version of the image sequence, x and y denote the spatial location within the image frame, and $a_i$ is a binary indicator that belongs to the set $\{-1,0,1\}$. Some embodiments may select i=$\{0,1,2,3\}$.

Alternative Exemplary Scaling Embodiments

Some inter-layer prediction embodiments comprise an offset in the inter-layer prediction process. Some embodiments may comprise a process described in equation 2.

$$HDR(x, y) = \sum_{\forall i} a_i * LDR(x, y) << i + \text{Offset}(x, y) \qquad (2)$$

where Offset(x,y) is the offset value. In some embodiments, the offset value may be signaled with the scaling values. Alternatively, it may be signaled as part of a residual refinement process.

Spatial Adaptivity

In some embodiments, control of the prediction process may be enabled at fine granularity. For example, when the baselayer video codec employs a block based structure, the inter-layer prediction process may vary the scaling and offset parameters on a similar block grid. In some embodiments, this may be achieved by sending scaling and/or offset information from the encoder to the decoder within an enhancement bit-stream.

In some signaling embodiments, the scaling factors may be transmitted differentially. That is, the scale factor may be predicted from previously received scale factors. Then, a correction may be transmitted in the bit-stream. Some embodiments may predict the scale factor from the upper or left-most neighbor to the current block. Alternatively, some embodiments may predict the scale factor as the minimum value of the upper or left-most neighbor.

In addition, in some embodiments, the encoder may signal the correction value as a function of the upper and left-most neighbors. For example, the encoder and decoder may utilize a specific context or state for signaling when the neighbors have the same scale factor. An alternative state may be utilized when the neighbors have different scale factors.

High Level Syntax

Some embodiments of the present invention comprise high dynamic range video coding where the scale factor is the same throughout an image region. To accommodate these cases, high level information may also be transmitted from the encoder to the decoder. This high level information can disable the transmission of scaling and/or offset parameters on a block-by-block or region-by-region basis. For the case that transmission of the parameters is disabled, the high level information may comprise the scaling and/or offset information to be utilized. In some embodiments, this high level signaling will occur on a macroblock, slice, picture or sequence basis.

Transform Domain Processing

In some embodiments of the present invention, the inter-layer prediction process operates on intensity data. That is, the information is decoded and converted to the spatial domain by reversing any transform utilized for signaling. In alternative prediction embodiments, the scaling and offset operations may be directly applied in the transform domain. In these embodiments, the transform coefficients may be de-quantized and then scaled by scale factors. In some embodiments, transform coefficients may be processed differently depending on their frequency characteristics. For example, in some embodiments, the scaling operation may be applied solely to the AC coefficients while the offset operation may affect the DC component. In some embodiments, different scaling and offset operations may be signaled for different coefficients or coefficient types.

Some embodiments of the present invention may comprise a video codec that may adaptively switch between transform domain and spatial domain prediction mechanisms. In some embodiments, this switch may be signaled on a sequence, frame or slice basis. In some embodiments, this switch may operate at finer granularity, such as a block or macro-block.

Color and Color Space Issues

An issue in scalable, high dynamic range video coding is the management of color. In some embodiments of the present invention, a color transform may be used prior to inter-layer prediction. This addresses the fact that most color spaces utilized for video coding are not iso-luminant. For example, a video codec typically transmits data in the YCbCr color space with code word mappings defined in International Telecommunication Union, "Parameter Values for the HDTV standards for production and international programme exchange," ITU-R BT.709-5, April, 2002.

Some embodiments of the present invention perform an inter-layer prediction process in a color space closely related to the coding color space. In some exemplary embodiments, the color transform may be expressed in the following equations:

$$Y_{LDR} = Y_{LDR}$$

$$b = \frac{Cb_{LDR}}{Y_{LDR} + Cr_{LDR} + Cb_{LDR}}$$

$$y = \frac{Y_{LDR}}{Y_{LDR} + Cr_{LDR} + Cb_{LDR}}$$

where $Y_{LDR}$, $Cb_{LDR}$ and $Cr_{LDR}$ are the luma and chroma components in the low dynamic range image sequence, respectively. Then, the scaling and offset process may be applied to $Y_{LDR}$ to generate $Y_{HDR}$. Finally, the inter-predicted region may be computed with the following equations:

$$Y_{HDR} = Y_{HDR}$$

$$Cb_{HDR} = \frac{bY_{HDR}}{y}$$

$$Cr_{HDR} = \frac{(1-b-y)Y_{HDR}}{y}$$

where $Cb_{HDR}$ and $Cr_{HDR}$ are predictions for the color components in the high dynamic range layer.

In some embodiments wherein $Y_{LDR}$, $Cb_{LDR}$ and $Cr_{LDR}$ are not represented at the same resolution, the components may be resampled. In some exemplary embodiments, applications may down-sample the luma component when the chroma components are stored at lower resolution. Alternatively, the chroma components may be up-sampled to match the resolution of the luma component.

Alternative Color and Color Space Issues

In some embodiments of the present invention, inter-layer prediction may operate directly on the decoded data without employing a color transform. In some exemplary embodiments, the prediction process may be expressed by the following equations:

$Y_{HDR}(x,y) = \text{Scale}(x,y,c) * Y_{LDR}(x,y) + \text{Offset}(x,y,c)$ $Cb_{HDR}(x,y) = \text{Scale}(x,y,c) * Cb_{LDR}(x,y) + \text{Offset}(x,y,c)$ $Cr_{HDR}(x,y) = \text{Scale}(x,y,c) * Cr_{LDR}(x,y) + \text{Offset}(x,y,c)$ where the scaling and offset parameters are now a function of both spatial location and chroma component. That is, the reconstructed luma and chroma values are scaled with different scale factors.

In some exemplary inter-prediction processes, the luma and chroma values may be scaled with the same scale factor but with different offsets. This may be expressed with the following equations:

$Y_{HDR}(x,y) = \text{Scale}(x,y) * Y_{LDR}(x,y) + \text{Offset}(x,y,c)$ $Cb_{HDR}(x,y) = \text{Scale}(x,y) * Cb_{LDR}(x,y) + \text{Offset}(x,y,c)$ $Cr_{HDR}(x,y) = \text{Scale}(x,y) * Cr_{LDR}(x,y) + \text{Offset}(x,y,c)$ In these embodiments, the scale factor may not depend on the chroma component. In some embodiments, the encoder may transmit the offsets within the enhancement layer bit-stream.

In other exemplary embodiments of the inter-prediction process, the luma and chroma values may be scaled with the same scale factor and the offset for the chroma values may be dependent on the offset of the luma values as well as the decoded image data. This relationship may be expressed in the following equations:

$$Y_{HDR}(x,y) = \text{Scale}(x,y) * Y_{LDR}(x,y) + \text{Offset}(x,y)$$

$$Cb_{HDR}(x,y) = \text{Scale}(x,y) * Cb_{LDR}(x,y) + f(\text{Offset}(x,y), Cb_{LDR}(x,y), Y_{LDR}(x,y))$$

$$Cr_{HDR}(x,y) = \text{Scale}(x,y) * Cr_{LDR}(x,y) + f(\text{Offset}(x,y), Cr_{LDR}(x,y), Y_{LDR}(x,y))$$

where f( ) denotes a mapping operation.

An exemplary mapping operation may be expressed as:

$$f(\text{Offset}(x, y), A_{LDR}(x, y), Y_{LDR}(x, y)) = \text{Offset}(x, y) \frac{A_{LDR}(x, y)}{Y_{LDR}(x, y)}$$

where $A_{LDR}(x,y)$ denotes an arbitrary color component such as Cb or Cr.

As mentioned before, the chroma and luma components may be represented on different sampling grids. To address this problem, the chroma and luma data may be resampled to the same resolution. In some embodiments, a different mapping process may be employed. In some exemplary embodiments, the mapping relationship may be expressed as:

$$f(\text{Offset}(x, y), A_{LDR}(x, y), Y_{LDR}(x, y)) = \text{Offset}(x, y) \frac{\text{Avg}(A_{LDR}(x, y))}{\text{Avg}(Y_{LDR}(x, y))}$$

where Avg( ) denotes the mean operator. In another exemplary embodiment, the mean may be replaced with a summation operation. In other embodiments, non-linear operations such as the median, min and max operations may be beneficial.

In some exemplary embodiments, the mean operator (or an alternative operator) may be performed in a different domain than that of the Offset variable. In some exemplary embodiments, the mean operation may be computed in the transform domain by operating solely on the DC coefficient. Similarly, in embodiments wherein the spatial resolutions of the chroma and luma coefficients are not matched, the mean operation may be computed by analyzing multiple DC coefficients in the luma baselayer.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for predicting a high dynamic range image element, said method comprising:
   receiving low dynamic range (LDR) image data;
   receiving high dynamic range (HDR) image data comprising prediction data and an HDR residual image element;
   extracting an LDR image element from said LDR image data, wherein said LDR image element is represented in a coding color space;
   converting said LDR image element to an alternative color space, thereby creating a color-converted image element;
   modifying said color-converted image element based on said prediction data;
   re-converting said modified, color-converted image element to an HDR prediction image element, wherein said HDR prediction element is in said coding color space; and
   combining said HDR prediction image element with said HDR residual image element to form an HDR image element.

2. A method as described in claim 1 wherein said LDR image element comprises a spatial domain intensity value.

3. A method as described in claim 1 wherein said LDR image element comprises a transform domain coefficient.

4. A method as described in claim 1 wherein said modifying comprises scaling said color-converted image element.

5. A method as described in claim 1 wherein said modifying comprises applying an offset to said color-converted image element.

6. A method as described in claim 1 wherein said modifying comprises scaling said color-converted image element and applying an offset to said color-converted image element.

7. A method as described in claim 1 wherein said modifying varies in relation to spatial location.

8. A method as described in claim 1 wherein said converting comprises application of the following equations:

$$Y_{LDR} = Y_{LDR}$$

$$b = \frac{Cb_{LDR}}{Y_{LDR} + Cr_{LDR} + Cb_{LDR}}$$

$$y = \frac{Y_{LDR}}{Y_{LDR} + Cr_{LDR} + Cb_{LDR}}$$

where $Y_{LDR}$, $Cb_{LDR}$ and $Cr_{LDR}$ are the luma and chroma components in the low dynamic range (LDR) image element, respectively.

9. A method as described in claim 1 wherein said modifying comprises at least one of a scaling and an offset operation.

10. A method as described in claim 1 wherein said modifying comprises at least one of a scaling and an offset operation being applied to a luminance component, $Y_{LDR}$, of said LDR image element to determine an HDR luminance component, $Y_{HDR}$.

11. A method as described in claim 1 wherein said re-converting comprises application of the following equations:

$$Cb_{HDR} = \frac{bY_{HDR}}{y}$$

$$Cr_{HDR} = \frac{(1-b-y)Y_{HDR}}{y}$$

where $Cb_{HDR}$ and $Cr_{HDR}$ are HDR prediction image color components.

12. A method for predicting a high dynamic range image element, said method comprising:
   receiving low dynamic range (LDR) image data;

receiving high dynamic range (HDR) image data comprising prediction data and an HDR residual image element;
extracting an LDR image luminance element from said LDR image data;
extracting an LDR image chrominance element from said LDR image data;
modifying said LDR image luminance element with a luminance modification operation, thereby creating an HDR luminance prediction element;
modifying said LDR image chrominance element with a chrominance modification operation, thereby creating an HDR chrominance prediction element; and
combining said HDR luminance prediction element and said HDR chrominance prediction element with said HDR residual image element to form an HDR image element.

13. A method as described in claim 12 wherein said luminance modification operation varies in relation to element spatial location.

14. A method as described in claim 12 wherein said luminance modification operation varies in relation to element spatial location and element magnitude.

15. A method as described in claim 12 wherein said chrominance modification operation varies in relation to element spatial location.

16. A method as described in claim 12 wherein said chrominance modification operation varies in relation to element spatial location and element magnitude.

17. A method as described in claim 12 wherein said luminance modification operation varies in relation to element spatial location and said chrominance modification operation varies in relation to element spatial location, element magnitude and a corresponding luminance element magnitude.

18. A method for predicting a high dynamic range image element, said method comprising:
receiving a low dynamic range (LDR) image element;
receiving a high dynamic range (HDR) image element corresponding to said LDR image element;
compressing said LDR image element;
decompressing said compressed LDR image element;
extracting a decompressed LDR image luminance element from said LDR image element;
extracting a decompressed LDR image chrominance element from said LDR image element;
modifying said LDR image luminance element with a luminance modification operation;
modifying said LDR image chrominance element with a chrominance modification operation;
calculating a residual HDR image element by comparing said modified, decompressed LDR image luminance element and said decompressed LDR image chrominance element with said HDR image element.

19. A method as described in claim 18 wherein said luminance modification operation comprises a scaling operation that is related the spatial position of said LDR image luminance element.

20. A method as described in claim 18 wherein said chrominance modification operation comprises a scaling operation that is related the spatial position of said LDR image chrominance element and the magnitude of said LDR image chrominance element.

21. A method as described in claim 18 wherein said chrominance modification operation comprises a scaling operation that is related the spatial position and magnitude of said LDR image chrominance element and the magnitude of said LDR image luminance element.

* * * * *